United States Patent Office 2,960,505
Patented Nov. 15, 1960

2,960,505
MORPHINE DERIVATIVE

Ulrich Weiss, Bethesda, Md., assignor to Mozes J. Lewenstein, Kew Gardens, N.Y.

No Drawing. Filed Dec. 17, 1957, Ser. No. 703,238

4 Claims. (Cl. 260—285)

This invention relates to a new and improved morphine derivative and has particular relation to 14-hydroxy-dihydromorphine and its salts.

Much effort has been spent in attempts to prepare improved morphine derivatives, which have an increased or improved analgesic action and/or diminished side effects. Most of the work done in this connection was dericted to the reduction of undesired side effects, particularly the reduction of addiction liability, but the preparation of analgesics having increased or improved action is, of course, likewise desirable.

While it has been found feasible to prepare substances with much greater activity, weight by weight, than morphine, this increased effect has been all too often attained at the expense of the duration of analgesic action. Yet, in the treatment of patients who suffer from severe pain over long periods of time, it would be obviously very important to have analgesics of strength equal to, or, if possible, greater than that of morphine, and at the same time of longer lasting action than morphine. Little success has been attained so far in the search for such compounds.

It has now been found that according to the present invention a novel derivative of morphine, i.e. 14-hydroxy-dihydromorphine, can be prepared, which has the desirable properties outlined above. Pharmacological tests have shown that this compound is twice as active, weight by weight, as morphine and its analgesic action lasts almost twice as long.

This new compound has the following structural formula:

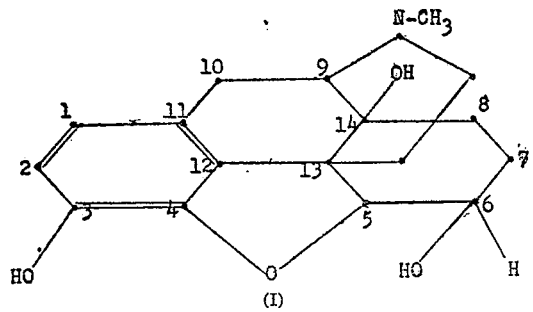

(I)

The compound of the above Formula I can be prepared by the reduction of the corresponding ketone 14-hydroxy-dihydromorphinone which is described in Weiss, Journ. Amer. Chem. Soc. 77, 5891 (1955), and in U.S. Patent No. 2,806,033. This reduction is preferably carried out with $NaBH_4$ in ethanol. Another procedure for preparing the compound of the invention consists in the HBr-demethylation of the corresponding codeine derivative 14-hydroxy-dihydrocodeine B, described in R. E. Lutz and L. F. Small, Journ. Organ. Chem. 4, 220 (1939).

The following examples describe some processes for preparing the compound of the invention and some best ways for carrying out these processes, to which the invention is not limited. The structural formulas of Compounds II and III are shown at the end of this specification.

Example 1

PREPARATION OF 14-HYDROXYDIHYDROMORPHINE (I) BY REDUCTION OF 14-HYDROXYDIHYDROMORPHINONE (II) WITH $NaBH_4$

A suspension of 15.0 grams of Compound II in 300 ml. of ethanol is added to a suspension of 15 grams of $NaBH_4$ in 1200 ml. of ethanol at ordinary room temperature of e.g. 15°–25° C. The solids disappear within a short time, e.g. 5–10 minutes, and a moderately strong evolution of gas starts, which subsides after about 30 minutes. A flocculent precipitate forms gradually. The mixture is allowed to stand at room temperature of e.g. 15°–25° C. for about one day.

The excess of $NaBH_4$ is destroyed by slow addition, with stirring and cooling, of 190 ml. of acetone. A white, curdy precipitate forms. The mixture is now concentrated in a vacuum of e.g. 20 mm. Hg, to less than ½ of its volume. An equal volume of aqueous 10% NaOH is added, and the liquid is brought to ebullition and kept boiling for 1 to 2 minutes. The resulting clear, colorless solution is cooled and acidified by dropwise addition of aqueous 5% HCl. The liquid is next treated with charcoal, filtered and the filtrate is made weakly alkaline by the addition of dilute aqueous ammonia solution, after the addition of 0.1 to 0.2 g. $Na_2S_2O_4$. The resulting liquid is next extracted 8–10 times with a 2:1 mixture of chloroform and ethanol. The combined extracts are dried with anhydrous sodium sulfate, filtered and the filtrate is evaporated to dryness in vacuo. The chloroform is expelled completely by addition of several portions of ethanol and evaporation in vacuo after the addition of each portion.

Compound I thus obtained in crude condition as a microcrystalline residue of about 14 grams, is dissolved by gentle warming in about 220 ml. of ethanol and added to a solution of 10 grams of tartaric acid in the minimum amount, e.g. 20 ml. of water. This mixture is seeded with a few crystals of bitartrate of Compound I and kept at room temperature for several days. Filtration and washing with acetone gives about 13 grams of the bitartrate of Compound I.

This compound is dissolved with gentle warming in 130 ml. of water and the solution is adjusted to a pH of about 8 (light pink color on phenolphthalein paper) by cautious addition of dilute aqueous ammonia solution. On seeding and rubbing, the pure base i.e. Compound I crystallizes. Yield: 5.1 grams. Additional material of good quality can be obtained from the aqueous mother liquors by extraction with a chloroform-ethanol mixture. The acetone wash-liquids of the bitartrate, on evaporation and conversion of the salt residue into the free base, likewise give an additional crop of Compound I of acceptable quality.

In substantially pure condition, Compound I melts at 252°–253° C. to a red liquid. The mixed M.P. with the starting material (II) is strongly depressed (220°–225° C.). By recrystallization from ethyl acetate, the 14-hydroxy-dihydromorphine is obtained as a white, microcrystalline powder. It melts to a red liquid at 252°–253° C., which decomposes upon further heating a few degress above its melting point. The elementary analysis gave values in good agreement with the formula $C_{17}H_{21}NO_4$. Like many morphine derivatives with the oxygen bridge intact, this compound gives a fine blue color with ferric chloride in aqueous medium, but not in alcoholic medium. It does not gives any color with m-dinitrobenzene and alkali.

Example 2

PREPARATION OF 14-HYDROXY-DIHYDROMORPHINE (I) BY DEMETHYLATION OF 14-HYDROXY-DIHYDROCODEINE B (COMPOUND III)

35 ml. of concentrated aqueous hydrobromic acid is heated to about 90° C. in a flask equipped with reflux condenser and stirrer and 3.5 grams of Compound III is introduced into the heated hydrobromic acid. The temperature of the mixture is brought to 115° C. as fast as possible and maintained between 115° and 120° C. for 20 minutes.

The resulting brown solution is chilled in ice, diluted with ice-water and rendered alkaline by the dropwise addition, under stirring and cooling, of a solution of 4 grams of NaOH in 40 ml. of water. A small amount of non-phenolic material is removed by extraction of the resulting alkaline product with several portions of chloroform. The aqueous phase is acidified with aqueous 5% hydrochloric acid, treated with charcoal and to the filtrate dilute aqueous ammonia solution is cautiously added to beginning phenolphthalein-alkalinity. From this solution the 14-hydroxy-dihydromorphine is isolated over the bitartrate in the manner described in the above Example 1.

The 14-hydroxy-dihydrocodeine B used as starting material in this example can be prepared from 14-hydroxy-dihydrocodeinone by catalytic reduction, following Lutz and Small (l.c.).

It has been found that a wide variety of salts of dihydrohydroxymorphine can be prepared. They include the hydrochloride, hydrobromide, neutral and acid sulfate, phosphates, the nitrate, acetate, benzoate, salicylate, neutral and acid fumarate and malate, terephthalate, ethanesulfonate, the bitartrate already mentioned above, and others.

Water-soluble salts with volatile acids (e.g. hydrochloric and acetic acid) can be prepared by adding an aqueous solution of slightly more than one equivalent of the acid to an aqueous suspension of the base and evaporating the solution thus formed under reduced pressure. The residue can then be recrystallized. Salts of the non-volatile inorganic acids (e.g. sulfuric acid) can be prepared by adding the stoichiometric amount of the acid to an aqueous suspension of the base and treating the resulting salt solution in the manner described above. Salts of organic acids which are difficultly soluble in water (e.g. the benzoate), can be prepared by reacting the acid and the base in equivalent amounts in ethyl alcoholic medium and evaporation of the solution.

The new compounds of this invention are useful as narcotic, analgesic and sedative agents and can be administered per os as well as subcutaneous injection. The formulas of Compounds II and III are as follows:

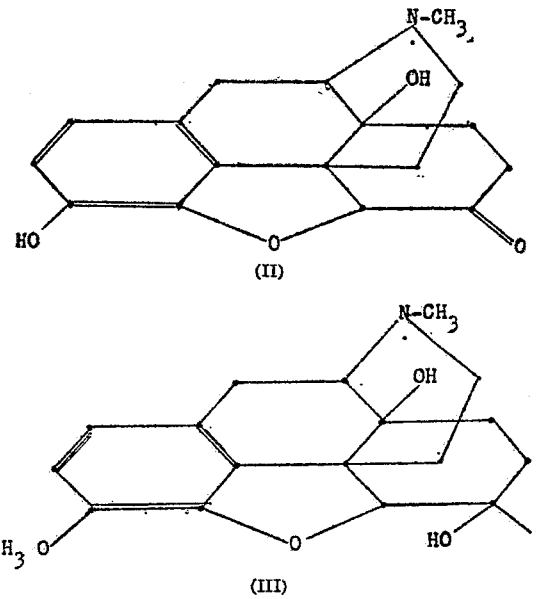

(II)

(III)

What is claimed is:
1. 14-hydroxy-dihydromorphine.
2. A therapeutically applicable acid addition salt of 14-hydroxy-dihydromorphine.
3. The bitartrate of 14-hydroxy-dihydromorphine.
4. The hydrochloride of 14-hydroxy-dihydromorphine.

References Cited in the file of this patent

UNITED STATES PATENTS

| | | |
|---|---|---|
| 2,178,010 | Small | Oct. 31, 1939 |
| 2,778,832 | Gates | Jan. 22, 1957 |

OTHER REFERENCES

Bentley: The Chem. of Morphine Alkaloids, 1954, N.Y. Oxford Press, pages 119 and 254.